Nov. 16, 1926.

K. V. KNAPP ET AL 1,607,162

ELECTRICAL CONTROL

Filed July 1, 1924

INVENTORS.
Kenneth V. Knapp
William T. Anderson
BY
Frank C. Fischer Jr.
ATTORNEY Nov. 16, 1926.

K. V. KNAPP ET AL 1,607,162

ELECTRICAL CONTROL

Filed July 1, 1924    2 Sheets-Sheet 2

Patented Nov. 16, 1926.

1,607,162

UNITED STATES PATENT OFFICE.

KENNETH V. KNAPP AND WILLIAM T. ANDERSON, JR., OF NEWARK, NEW JERSEY, ASSIGNORS TO HANOVIA CHEMICAL AND MFG. CO., OF NEWARK, NEW JERSEY, A CORPORATION OF NEW JERSEY.

ELECTRICAL CONTROL.

Application filed July 1, 1924. Serial No. 723,600.

The present invention relates to operating and controlling systems for alternating current vapor electrical devices, particularly quartz mercury lamps, and it is one object of the invention to provide a novel system of this kind comprising an autotransformer, a primary sliding core reactance coil, and a secondary reactance coil.

Another purpose of the invention is to produce an auto-transformer to replace the ordinary single wound transformer, and which is comparatively small and much lighter than the customary single wound transformer.

A further aim of the invention is in the provision of a slide-core primary reactance coil constituting a substitute for a rheostat, adapted to consume a limited amount of current and which has therefore very little heat radiation.

A still further object of the invention is the provision of a slide core primary reactance permitting an easy and delicate adjustment of voltage and current consumption by the vapor electrical device.

In alternating current vapor electrical devices the voltage across the vapor electrical device has hitherto been controlled by adjustable rings on the rheostat coils and by a plunger held down by the magnetic flux of the scondary reactance coil, which action shunted out part of a rheostat coil, thereby causing a drop of potential energy across the device and creating fluctuations in current flow and like disavantages.

In such construction, the transformer required is necessarily larger, heavier and clumsier than desirable with apparatus of this kind, and furthermore the periodic current consumption with such type of apparatus is undesirably large.

The present invention does away with all these disadvantages by substituting for the wire rheostat a slide-core primary reactance coil permitting an easy and delicate adjustment of voltage and current consumption by the electrical vapor device.

The slide-core primary reactance coil and auto-transformer together permit a short circuit current of between 7 and 9 amperes compared to 17 amperes for the usual devices and a starting current of 6 amperes compared to 12 amperes for the former devices and the starting current moreover gradually decreases to approximately 5 to 6 amperes. Thus not only a large saving in current consumption, but also a reduction in wear of the vapor electrical equipment itself is effected. The efficiency of operation of the new control and operating device is between 90 and 95% of current consumption, compared to 70% for the usual apparatus.

Futhermore the new device is extremely simplified in construction, the plunger control and the accompanying elements of complex nature are dispensed with.

The above and other purposes and advantages of the novel control system will become more fully apparent as the description thereof proceeds and will then be specifically set forth in the appended claims and shown in the accompanying drawings, forming a material part of this disclosure, and in which:—

Figure 1:
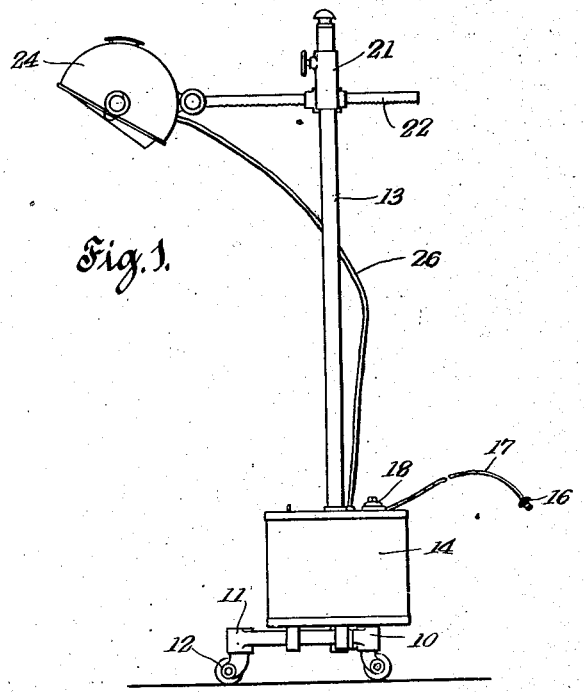
Figure 1 is a side elevational view of an electrical vapor lamp, or quartz mercury lamp, equipped with a novel control and operating system constructed according to the present invention.
Figure 2:
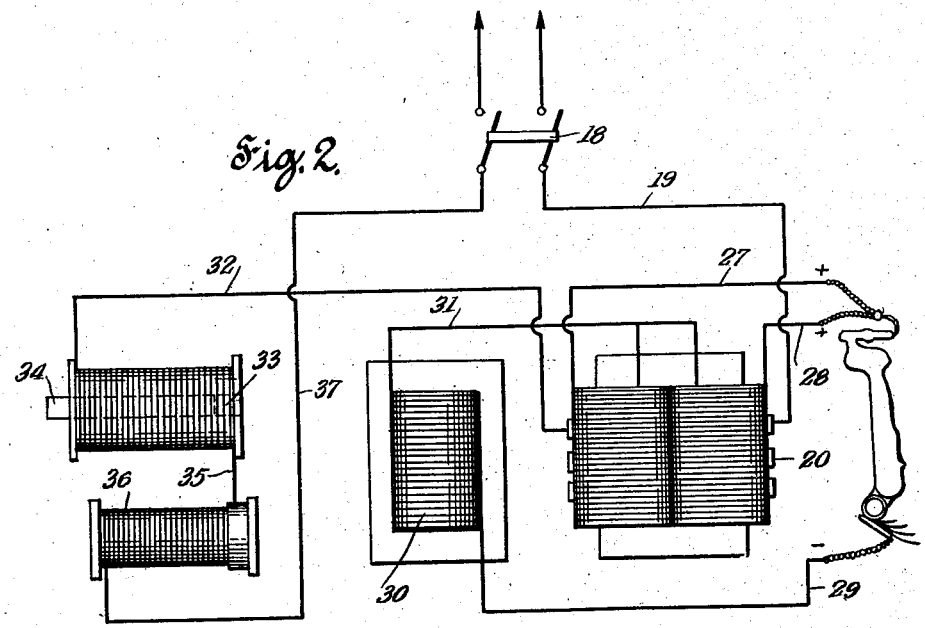
Figure 2 is a diagrammatic view of the electrical connections and circuits.
Figure 3:
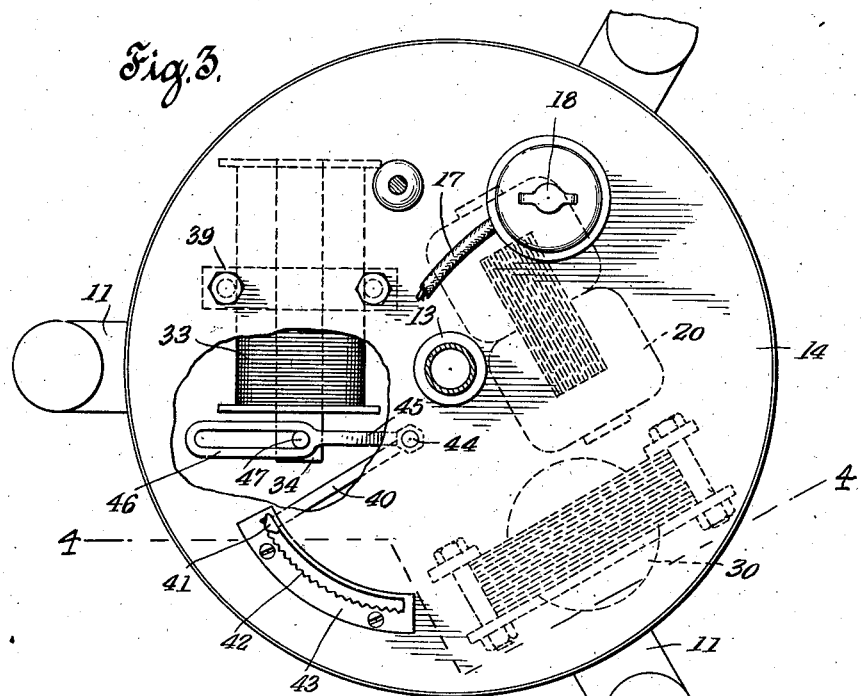
Figure 3 is a top plan view of a tripod floor stand for the apparatus.

In the drawings, the base, generally designated by the numeral 10, comprises a central flat plate with three equal radiating extensions 11 having their ends drilled to rotatably receive the stems of castors 12 by means of which the entire apparatus is readily trundled about as may be desired.

Figure 4:
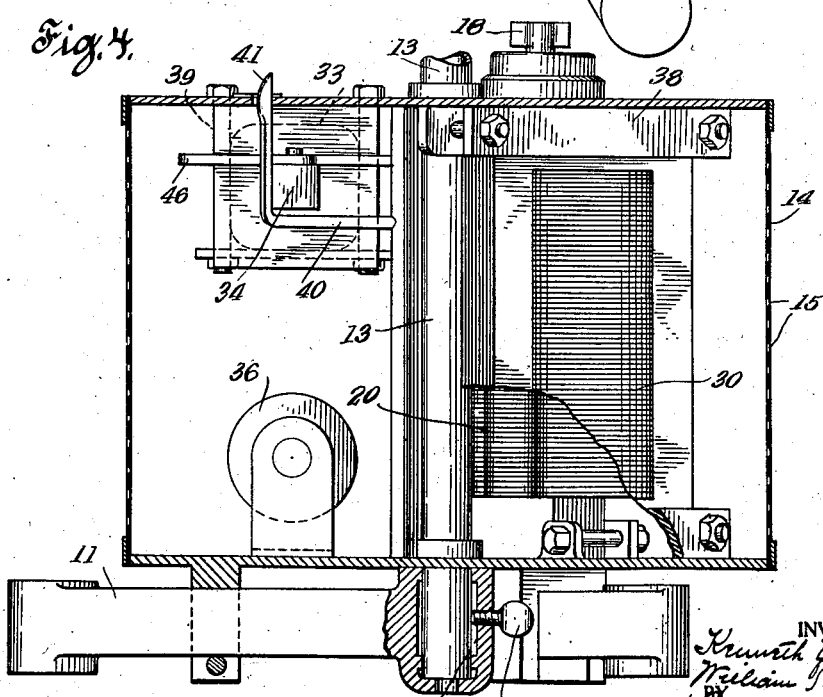
Figure 4 is a vertical section taken mainly on line 4—4 of Figure 3.

A hollow central column 13 is mounted in a cylindrical casing 14, the peripheral wall of which is preferably perforated, as indicated at 15 in Figure 4, in order to permit free access of air to the auto-transformer, a primary sliding core reactance coil and a secondary reactance coil carried within the casing 14; the column entering a chamber 23 and may be clamped by a winged screw 25 therein.

Current supplied from any convenient source is received by a plug 16, the conducting cord 17 of which is secured to a switch 18 from which it passes over a conductor wire 19 to an auto-transformer, generally indicated at 20.

Adjustably mounted on the column 13 is a sleeve 21, slidably and rotatably operated by hand, the sleeve carrying a horizontal rack 22 adjustable lengthwise and having at one end a lamp 24 adjustably secured in the customary manner and to which current is conducted by the cable 26, the lamp containing one negative and two positive poles.

The cable 26 connecting the casing to the lamp 24 contains wires 27 and 28 leading from the two positive poles to the coils of the auto-transformer 20, and one wire 29 leading from the negative lamp pole to the secondary reactance coil, generally indicated at 30, from which a conductor wire 31 leads to the coils of the auto-transformer.

One of the coils of the transformer 20 is connected by a wire 32 to one coil of the primary reactance coil 33 containing a sliding core 34, and a contact 35, operated in connection with the core, may be moved relative to another coil 36 of the primary reactance which is connected by a wire 37 to the switch 18, to which the line wires are attached.

The secondary reactance coil 30 is attached to the casing 14 by brackets 38 and the primary reactance coil is secured within the casing 14 by brackets 39. The control of the movements of the sliding core 34 is effected by a control handle 40, the upturned grip 41 of which extends through a curved slot 42 of a segment plate 43 attached to the top wall of casing 14, the edge of the slot having teeth to provide a step-by-step motion of the grip and to hold the same when in an adjusted position, and a scale or dial may be provided on top of the plate 43.

The inner end of the control lever 40 is secured to a rock-shaft 44 to which is also attached the inner end of a lever 45 having in its outer portion an elongated slot 46 to guide a pin 47 on the slidable core 34 of the primary reactance coil.

From the foregoing it will be understood that by the proper operation of the grip handle 41 an easy and delicate adjustment of the voltage and current consumption is possible and all periodic, large current consumption by the electrical vapor device operated thereby is positively eliminated.

It will be clear that changes may be made in the general arrangement and in the construction of the minor details of our invention without deviating from the spirit of the invention or departing materially from the scope of the same as specified in the appended claims.

What we claim as new and desire to secure by Letters Patent, is:—

1. An operating and controlling system for alternating current vapor electrical devices, comprising in combination with a three-poled device, an auto-transformer, a primary sliding core reactance coil, a secondary reactance coil, and means for manually shifting the core in the first named coil thereby controlling the voltage and current consumption delivered to said device.

2. An operating and controlling system for alterating current vapor electrical devices, comprising in combination with a three-poled lamp, an auto-transformer connected to the positive poles thereof, a secondary reactance coil connected to the negative pole, a primary reactance coil having a sliding core, lever means for manually actuating said core, and means for controlling the voltage and current consumption delivered to said lamp by the operation of said sliding core.

3. An operating and controlling system for alternating current vapor electrical devices, comprising a casing having perforated walls, an auto-transformer in said casing connections between the coils of said transformer and the positive poles of the vapor device, a secondary reactance coil connected to the negative pole of said vapor electrical device and to both poles of said transformer, a primary reactance coil, a contact movable over the coils of said primary reactance coil, a movable core for the other coil of said primary reactance controlling said contact, and means for effecting a step-by-step motion of said movable core.

4. An operating and controlling system for alternating current vapor electrical devices, comprising a casing, an auto-transformer, a secondary reactance coil, and a primary reactance coil within said casing, a column for said casing, means for clamping said column to the casing, a tripolar lamp carried by said column, connections between the two positive poles and the auto-transformer and between the negative pole and the secondary reactance coil, and means for successively controlling the voltage and current consumption by the lamp.

5. An operating and controlling system for alternating current vapor electrical apparatus comprising a lamp stand, a tripolar lamp carried thereby, a casing secured to said stand having perforated walls, a double-coiled auto-transformer, means for securing said transformer within said casing, means for connecting said auto-transformer to the two positive poles of the lamp, a slide core primary reactance coil in said casing, one pole of said primary reactance coil being connected to said auto-transformer and the other pole connected to a line switch, a slide connecting both elements of the primary reactance coil, and a secondary reactance coil within the casing connected to both coils of the auto-transformer and to the negative pole of the lamp.

6. In a system of control and operation for alternating current mercury vapor apparatus including a tri-polar lamp, means for rotating, raising and lowering said lamp, whereby the lamp may be accurately adjusted in operative position, a stand for supporting said adjusting means, a perforated casing on said stand, an auto-transformer, a secondary reactance coil and a primary reactance coil in said casing, said stand having castors, and electrical connections within said casing for allowing a graduated control of the voltage and the current consumption by said lamp.

7. In a system for controlling and operating alternating current mercury vapor lamps, a double coiled primary reactance coil, a sliding core operable within one of said coils, a contact sleeve slidable over the other coil in unison with the movement of said core, a casing over the coils, a handle extending through a slot in the casing, to operate said core, and a scale adjacent the slot by which the position of the core can be ascertained.

8. In a system for controlling and operating alternating current mercury vapor lamps, a double coiled primary reactance element, a sliding core operable within one of the coils of said element, a contact sleeve slidable over the other coil in unison with the movement of said core, a casing over the elements, and means for actuating said core and sleeves consisting of a rock-shaft in said casing, a slotted lever fixed on said shaft, a pin fixed in said core to engage the slot in said lever, a handle also fixed on said shaft to extend through a slot in said casing, and teeth on one edge of the slot to engage said handle to hold it in an adjusted position.

This specification signed and witnessed this 13th day of June, 1924.

WM. T. ANDERSON, Jr.
KENNETH V. KNAPP.